United States Patent [19]

Pieprzak et al.

[11] Patent Number: 5,349,527
[45] Date of Patent: Sep. 20, 1994

[54] METHOD OF SEISMIC TIME MIGRATION USING A MASSIVELY PARALLEL COMPUTER

[75] Inventors: Andrew Pieprzak, Houston; Peter T. Highnam, Austin, both of Tex.

[73] Assignee: Schlumberger Technology Corporation, Austin, Tex.

[21] Appl. No.: 811,565

[22] Filed: Dec. 20, 1991

[51] Int. Cl.$^5$ ............................................. G01V 1/00
[52] U.S. Cl. ..................................... 364/421; 367/45; 367/46
[58] Field of Search ................... 364/421, 420; 367/21, 367/45, 46, 50, 51; 340/825.52, 825.53

[56] References Cited

U.S. PATENT DOCUMENTS

| | | | |
|---|---|---|---|
| H482 | 6/1988 | Berryhill et al. | |
| 4,598,400 | 7/1986 | Hillis | 364/900 |
| 4,773,038 | 9/1988 | Hillis et al. | 364/900 |
| 4,827,403 | 5/1989 | Steele, Jr. et al. | 364/200 |
| 5,128,899 | 7/1992 | Boyd et al. | |
| 5,148,406 | 9/1992 | Brink et al. | 364/421 |
| 5,150,331 | 9/1992 | Harris et al. | 364/421 |

FOREIGN PATENT DOCUMENTS 8800711 1/1988 PCT Int'l Appl. .
2236393 4/1991 United Kingdom .

OTHER PUBLICATIONS

Blacquiere, Debeye, Wapenaar & Berkhout, *3D Table-- Driven Migration*, 37 Geophysical Prospecting 925 (1989).
Hale, *3-D Depth Migration via McClellan Transformations*, 56 Geophysics 1778 (1991).

*Primary Examiner*—Roy N. Envall, Jr.
*Assistant Examiner*—Frantzy Poinvil
*Attorney, Agent, or Firm*—Charles D. Huston

[57] ABSTRACT

A method for 3 dimensional, one pass migration of post stack seismic data is implemented on a massively parallel computer. The quality of the migration and speed of execution makes possible iterative 3D post stack depth migrations. The depth migration method computes in the frequency domain and downward continues one or more frequency planes through all depth levels of interest. For a single frequency, at each depth level, the method extrapolates a shifted position for each x,y position by applying a filter for 2D convolution. A processing component is assigned to each subgrid of x,y spatial positions and the processing components operate concurrently in parallel to determine filter coefficients independently for each x,y spatial position and to extrapolate the x,y shifted positions. The filter coefficients are derived independently at each x,y position by storing a limited table of filter coefficients in local memory of each processing component.

19 Claims, 7 Drawing Sheets

$$\begin{array}{ccccc} -\frac{c}{8} & 0 & \frac{c}{4} & 0 & -\frac{c}{8} \\ 0 & \frac{1}{8} & \frac{1}{4} & \frac{1}{8} & 0 \\ \frac{c}{4} & \frac{1}{4} & -\frac{1+c}{4} & \frac{1}{4} & \frac{c}{4} \\ 0 & \frac{1}{8} & \frac{1}{4} & \frac{1}{8} & 0 \\ -\frac{c}{8} & 0 & \frac{c}{4} & 0 & -\frac{c}{8} \end{array}$$

METHOD OF SEISMIC TIME MIGRATION USING A MASSIVELY PARALLEL COMPUTER

BACKGROUND OF THE INVENTION

The present invention relates to the field of seismic data processing, and in particular to a method for migrating seismic data using a massively parallel computer.

The Earth's subsurface can be Imaged by a seismic survey, therefore, seismic data acquisition and processing are key components in geophysical exploration. In a seismic survey, elastic acoustic waves are generated by a source at the Earth's surface and the waves are radiated into the Earth's subsurface. For land seismic surveys, the usual source is dynamite or a seismic vibrator, while for a marine seismic survey the source is typically an airgun array.

As the waves radiate downward through the Earth's subsurface, they reflect and propagate upwards towards the surface whenever the subsurface medium changes. The upward reflections are detected by a number of receivers and the reflected data recorded and processed in order to image the subsurface. Interpretation of these acoustic images of the subsurface formation leads to the structural description of the subsurface geological features, such as faults, salt domes, anticlines, or other features indicative of hydrocarbon traps.

While two dimensional ("2D") seismic surveys have been conducted since the 1920's, three dimensional ("3D") seismic surveys have only recently become widely used. 3D surveys more accurately reflect the subsurface positions of the hydrocarbon traps, but are expensive and time consuming to acquire and process. For an offshore 3D data set covering a 20×20 km area, it costs about $3M dollars (1991 dollars) to acquire the data with another $1M dollars for data processing to transform the raw data into useable images. Because the cost of such a seismic survey is considerably less than the cost of drilling an offshore oil well, 3D seismic surveys are often worth the investment.

Although 3D marine surveys vary widely in size (1,000 to 100,000 km$^2$), a typical marine survey might generate in excess of 40,000 data acquisition tapes. Data is accumulated at a staggering rate, about 1.5 million data samples every 10 seconds. A significant amount of time and money is spent in processing this enormous amount of data.

The result of the seismic survey is thus an enormous amount of raw data indicative of reflected signals which are a function of travel time, propagation, and reflection affects. The goal is to present the reflected amplitudes as a function of lateral position and depth.

A typical marine seismic survey goes through three distinct sequential stages—data acquisition, data processing, and data interpretation. Data processing is by far the most time consuming process of the three. The acquisition time for a medium to large 3D marine seismic survey is in the order of two months. Data is acquired by survey vessels traversing an area of the ocean along a series of parallel lines. A vessel may tow a number of sources (usually airgun arrays) and a number of receiver strings called hydrophone streamers (of length up to 5 kilometers). Sources are fired at 5 to 10 second intervals and the reflected seismic waves measured by up to 1000 hydrophone groups in every streamer. The measurements are recorded digitally on magnetic tapes. In addition to seismic data, navigation information is also recorded for accurate positioning of the sources and receivers. The resulting digital data must then be rendered suitable for interpretation purposes by processing the data at an onshore processing center. The processing sequence can be divided into the following five processing steps.

1. Quality Control, filtering and deconvolution. This processing is applied on a trace basis to filter noise, sharpen the recorded response, suppress multiple echoes, and generally improve the signal-to-noise ratio. Most of these signal processing operations can be highly vectorized.
2. Velocity analyses for migration. This processing estimates the velocity of the subsurface formations from the recorded data by modeling the propagation of acoustic waves with estimated velocities and checking for signal coherence in the acquired data. It is similar to migration but is applied to a small section of the data cube.
3. 3D dip moveout correction and stacking. This processing step, generally the most input/output intensive part of the processing, (i) sums together several traces in order to eliminate redundancy and reduce the signal-to-noise ratio, (ii) corrects for time delays that occur when the reflected signal is recorded by successive hydrophones that are located increasingly farther away from the energy source, and (iii) positions and orients the stacked data in accordance with the navigation information. After this processing step, the data is referred to as stacked data. This step normally constitutes on the order of a 100 to 1 reduction in data volume.
4. Migration. This processing step, computationally the most intensive, relocates the position of reflected strata, that are recorded in time, to their correct position in depth.
5. Enhancement and filtering. This processing step is used to enhance the migrated data using digital filtering techniques.

The stacking process (step 3) reduces the amount of data to what is essentially a three dimensional array of numbers (i.e. a data cube) representing amplitudes of reflected seismic waves recorded over a period of time (usually 8 seconds). Such data cubes can be large, for example, a medium size 3D survey may produce cubes as large as 1000×1000×2000 of floating-point numbers. The stacked data cube represents a surface recording of acoustic echoes returned from the earth interior and is not usually directly interpretable. The migration (or acoustic imaging process, step 4) is used to convert stacked data into an image or a map which can then be viewed as a true depth map cut out of the survey area.

Thus, migration is one of the most critical and most time consuming components in seismic processing is migration. Generally speaking, migration transforms the seismic data recorded as a function of time into data positioned as a function of depth using preliminary knowledge of the propagation velocities of the subsurface. In particular, migration moves dipping reflectors to their true subsurface position. Migration is typically performed on post stack seismic data to reduce the amount of processing time, but even so takes weeks of conventional supercomputer time for even medium size post stack seismic data cubes.

Most of the migration methods are based on the one way acoustic wave equation (compressional waves considered, shear waves ignored) using the exploding reflector model. In the exploding reflector model, stacked data are assumed to be recordings of a multitude of sources distributed along geological boundaries and exploded simultaneously. The post stack seismic data cube is considered to be recordings of upward traveling waves as they emerge from the Earth. (See generally, J. F. Claerbout, *Imaging the Earth's Interior* (1985), M. Dobrin & C. Savit, *Geophysical Prospecting* (1988), R. E. Sheriff, *Geophysical Methods* (1989), incorporated by reference for background)

3D seismic migration is becoming the norm in seismic processing and there are two types of methods: two pass and one-pass. In two pass migration, the 3D seismic data cube is migrated sequentially first in the x direction and next in the y direction (orthogonal directions). In one-pass migration an entire 3D data cube is downward continued as one. Various methods for 3D seismic migration have been proposed. (See generally. Blacquiere, Debeye, Wapenaar & Berkhout, *3D Table-Driven Migration*, 37 Geophysical Prospecting 925 (1989), Hale, *3-D Depth Migration via McClellan Transformations*, 56 Geophysics 1778 (1991), incorporated by reference for background)

The major advantage of one-pass 3D seismic migration is that for structurally complicated areas (faults or strata where steep angles dip) image accuracy is significantly improved. The major disadvantage of the 3D one-pass migration is the significant amount of processing time required. For a typical seismic survey using a terabyte of input data on tapes, the typical 3D processing sequence might take about thirty weeks on a large scale supercomputer. Four to five weeks of processing time is devoted to migration alone. Therefore, it would be a significant advance if an accurate, efficient 3D one-pass migration method were devised.

SUMMARY OF THE INVENTION

The present invention provides an accurate 3D one-pass migration method which achieves almost a 10 fold increase in efficiency over conventional migration processing methods. The method recognizes the parallel features of the migration problem and employs a massively parallel computer to implement the method.

The migration method of the present invention first transforms the seismic data from the space-time domain to the space-frequency domain using a Fourier transform process. Typically, the seismic data has already been stacked. The method migrates independently each plane of data corresponding to a single frequency to create the reflector map. Thus, the migration method transforms the space-frequency domain stacked data into a space depth cube.

The space-frequency data cube is stored in computer memory, because of its size usually a type of disk or remote memory. The frequency data cube is then grouped into frequency chunks comprising one or more frequency planes—i.e. x,y data planes of constant frequency. Grouping the frequency planes into frequency chunks improves input/output and computational efficiency.

For depth migration each frequency chunk is downward continued through the depth levels of interest for interpretation. This downward continuation process includes: modeling the velocity profile of the subsurface for the survey through the depths of interest; extrapolating all x,y spatial positions; and updating the depth map. For extrapolation, for a single frequency and a given depth, processing components of the massively parallel computer are assigned to subgrids of one or more x,y spatial positions. The extrapolation is then processed concurrently by operating a number of processing components in parallel to extrapolate all x,y spatial positions.

In the preferred form, the migration is performed using post stack seismic data. In one embodiment, the massively parallel computer uses a single instruction multiple data architecture. Pre-stack seismic data and other computer instruction techniques (e.g. multiple instruction multiple data) are possible alternatives without departing from the scope of the invention.

The velocity data cube is stored by inputting estimated velocity data for a number of x,y spatial positions at different depths and creating the velocity data cube representing depths of interest by interpolating between the input estimated velocity data. For a given depth, velocity data planes are read from the velocity data cube into the local memory of each processing component. If necessary, the processing component creates a particular velocity data plane for a particular depth by interpolation between the proximate velocity data planes residing in local memory.

The extrapolation applies a symmetric, frequency and velocity dependent, 2D filter as an approximation of the full 3D wavefield extrapolation. The filter coefficients are identified independently as a function of frequency and velocity for each x,y spatial position. Preferably filter coefficients are stored as a table in the local memory of each processing component. In the preferred method, a fixed $5 \times 5$ G operator is used in the filter structure for convolution. Alternatively, different size G operators with entries variant according to frequency and velocity are feasible.

The method of time migration of the present invention is similar to the depth migration method. In time migration, for each frequency chunk, a unique filter coefficient table is used.

DESCRIPTION OF THE PREFERRED EMBODIMENTS

I. Overview

The one-pass 3D migration of the present invention is implemented on a massively parallel computer, such as the Connection Machine 2 (CM2), a product of Thinking Machines Corporation, Cambridge, Mass. U.S. Pat. Nos. 4,598,400; 4,773,038; and 4,827,403 relate to such parallel computers (incorporated for reference). Preferably, the method starts with a post stack seismic data cube, i.e. data in the space-time domain stacked as x,y,t. A one dimensional transform is applied to every trace in the stacked cube converting the stacked cube from the time domain to the frequency domain—x,y,f.

Figure 1:
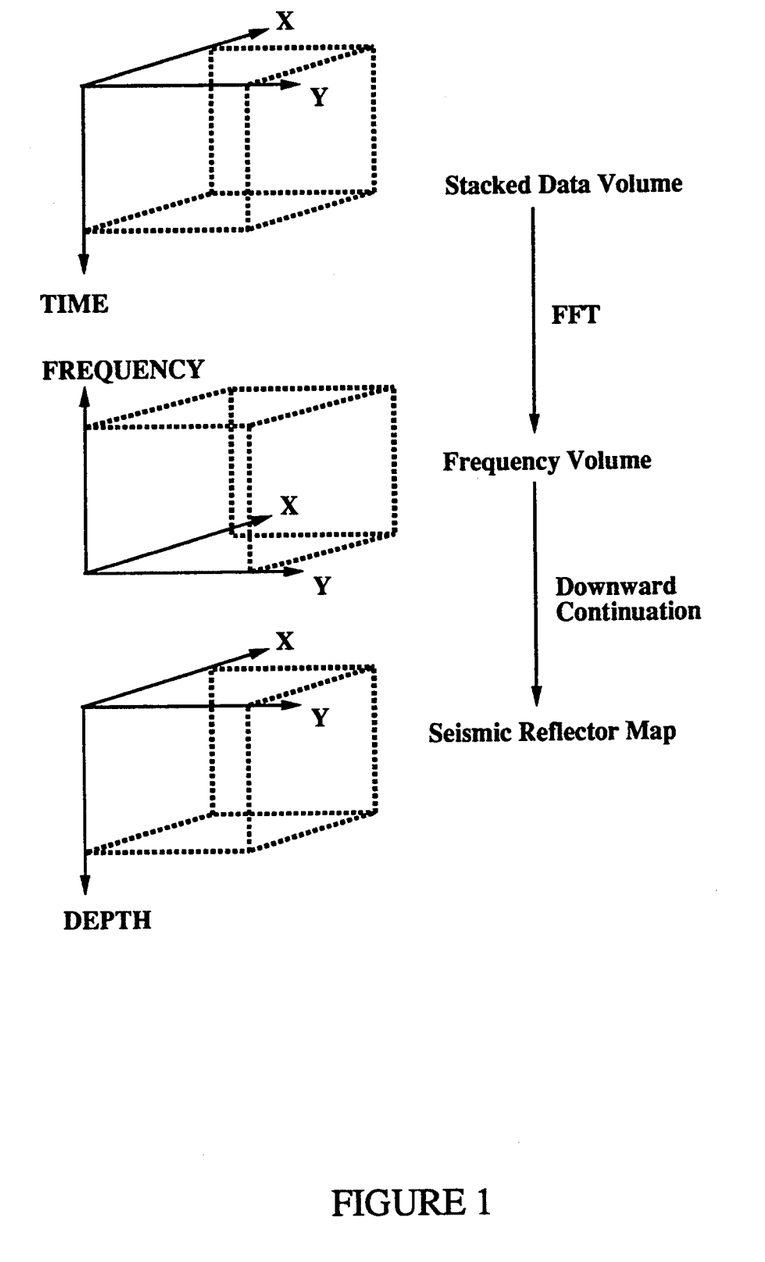
FIG. 1 is a schematic view of the 3D one-pass depth migration transformations.

The migration transformation is illustrated in FIG. 1. Thus, the migration method of the present invention transforms the post stack x,y,t space-time domain data into x,y,f space-frequency domain data through a downward continuation process into a reflector map, x,y,z in the space depth domain. The method is a recursive scheme of downward continuation and imaging based on the "exploding reflector" model.

A significant opportunity for parallel processing arises because each frequency plane of data, x,y,f is migrated independently to create the seismic reflector map. Another opportunity for parallel processing arises in the wavefield extrapolation of a 2D x,y frequency plane.

Wavefield extrapolation is a key part of all migration techniques that are based on the wave equation. The present method is based on the acoustic wave equation, i.e. compressional waves are taken into account only, and shear waves are neglected. Additionally, only the one way wave equation is used, exploiting the exploding reflector model. The method downward continues for each frequency of interest for all depths to be migrated. A constant frequency plane is a two dimensional plane with the same size and shape of the part of the seismic survey which is to be migrated. Generally speaking, for all depth values to be migrated and all frequencies of interest, 1) the filter is convolved for each frequency of interest for wavefield extrapolation, and 2) the wavefield extrapolation is used to update the seismic reflector map. Parallel processing is feasible because 1) all frequencies can be migrated in parallel because the migration of each frequency is independent, and 2) the convolution of the filter with a 2D frequency plane for wavefield extrapolation can be computed in parallel.

With these opportunities for parallel processing, the size of the 2D filter for extrapolation would conventionally be determined by the reflector angle. That is, in order to image steeply dipping reflectors, the filter size must be large. Large filter sizes pose a computational cost, even with parallel processing which for many seismic surveys (i.e. steeply dipping reflectors) may be computationally prohibitive.

The method of the present invention significantly reduces this computational cost by taking a slightly different approach to wavefield extrapolation. That is, wavefield extrapolation is performed by applying a 2D filter to every frequency in the data cube independently. In order to ensure the desired accuracy over a wide range of frequencies and at large dipping angles, a recursive Chebyshev scheme is employed to emulate the desired large filter. This large filter is expressed as the sum of small, constant size convolution filters along with additions. The filter coefficients are computed independently for each x,y position in the survey. The filter coefficients are based on a table with fine increments to permit interpolation. The table of filter coefficients is stored redundantly in the local memory of each processing component in the parallel computer to increase access efficiency.

II. Parallel Computer Configuration

Increasingly, a number of different types of parallel computers are available commercially. Such parallel computers typically employ a large number of processing components, with each processing component employing one or more processors. The processing components are cooperatively operated using a variety of schemes, with single instruction multiple data (SIMD), multiple instruction multiple data (MIMD), and pipeline processors being the most common.

In the preferred embodiment, a CM2 using a SIMD architecture is employed. The CM2 is available in a range of configurations between 4,096 and 65,536 processing elements. This range corresponds approximately to an achievable peak performance range of 500 Megaflops per second up to 8 Gigaflops per second. The amount of memory associated with the processing elements varies between 500 Megabytes and 8 Gigabytes and corresponds approximately to the same processing element population range. Thus, an 8,192 processing element CM2 would have an approximate peak performance of 1 Gigaflop per second and typically be configured with 1 Gigabyte of memory.

In the configuration of the preferred embodiment, a program executes on a frontend system, such as a Sun workstation sending computational requests to the CM2. The processing elements use Weitek chips to achieve a high aggregate floating point rate, with every 32 processing elements sharing a 32-bit or 64-bit Weitek floating point processor. A high degree hypercube is incorporated into the CM2 to facilitate data communication. Disk subsystems, known as Data Vaults, can be added to the CM2. A Data Vault can hold up to 60 Gigabytes and transfer data to and from the CM2 at over 20 Megabytes per second. In the present application, the term "remote memory" refers to memory where communication is relatively slow, such as disk subsystems like the Data Vaults. On the other hand, "local memory" refers to memory associated with each processing component, or in the case of the CM2 primarily associated with the processing elements.

By way of example, consider a seismic survey in the Gulf of Mexico yielding a post stack space-time seismic data cube (x,y,t) with 512×512 spatial dimensions (x,y) and each trace contains 2,001 time samples corresponding to about 8 seconds of reflected data. This space-time seismic data cube corresponds to approximately 2 Gigabytes of input data. In this example, 2 Gigabytes of input data can typically be supplied on tapes in the SEG-Y format with each tape containing 125 Megabytes of information. In the SEG-Y format every trace has a header of 60 4-byte words containing descriptive and contextual information relevant to that trace.

The raw data on the SEG-Y tapes are read into serial files on the Data Vault. After stripping the header files, this raw data now comprises a serial file comprising the space-time seismic data cube (x,y,t).

Figure 6:
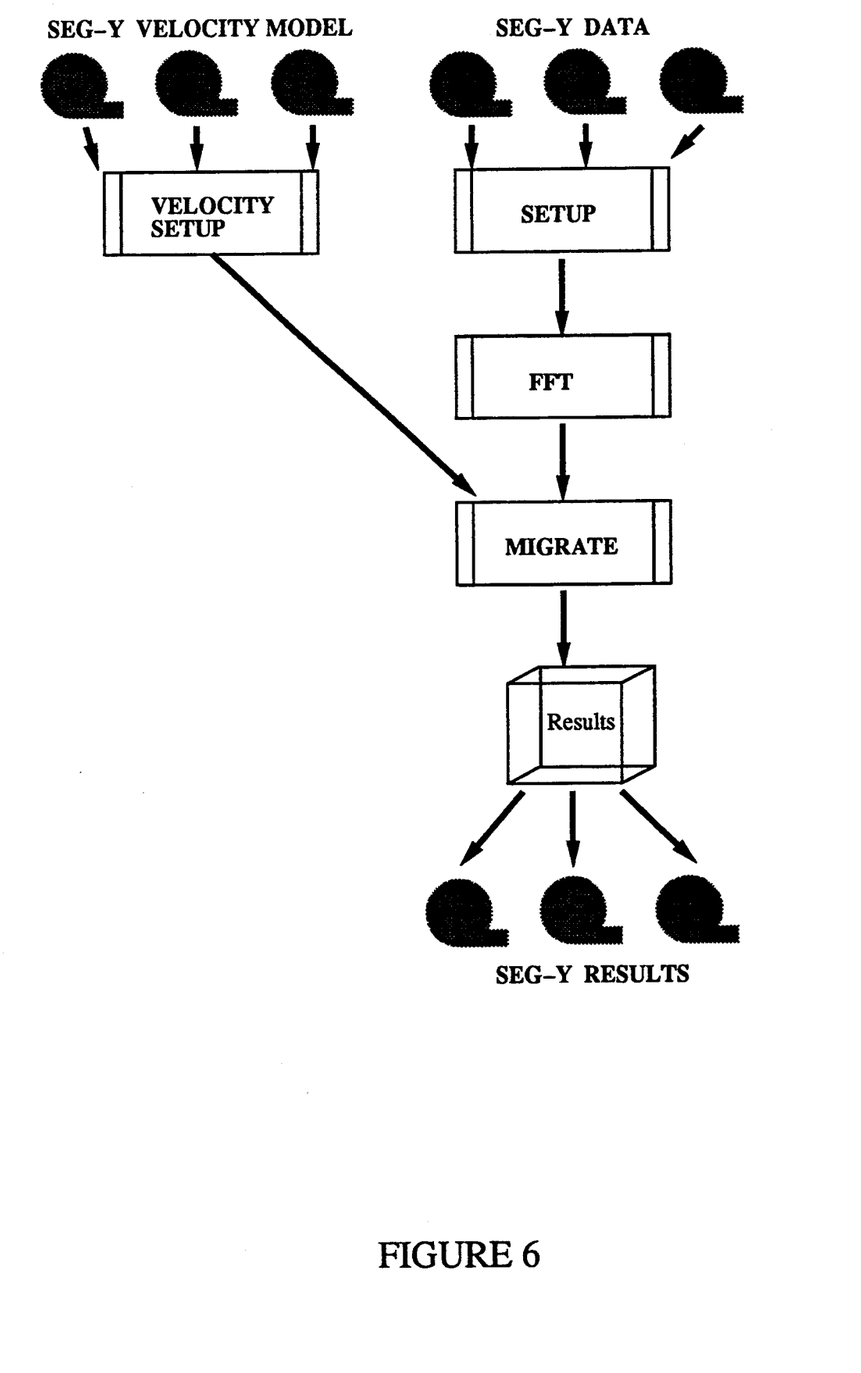
FIG. 6 is a schematic of the input/output flow paths of the method of the present invention.

The present method uses a Fourier transform method to transform each trace, thus creating a space-frequency data cube. See FIG. 1. Preferably, the space-frequency data cube is input into the Data Vault in a "parallel" format. The "parallel" format making it very efficient to read frequency planes from the space-frequency cube for migration to sustain high input and output. For example, a data input/output of 20 Megabytes per second using the "parallel" Data Vault format on a CM2 is obtainable. Refer to FIG. 6 for an overview of input-/output flow paths.

The filter coefficients are looked up in a table using velocity and frequency to select the filter coefficients. The subsurface velocity is of course spatially variant, i.e., the velocity is dependent upon the spatial position within the seismic survey (x,y,d). For example, the present embodiment contemplates using 13 filter coefficients ($h_n$) for dipping reflectors up to 65° and 18 filter coefficients for dipping reflectors up to 80° . A table of filter coefficients is stored and indexed by the relationship of velocity and frequency, with linear interpolation as required.

In the preferred embodiment, a full velocity plane for the depth of interest is read from remote memory (Data Vault) into local memory for each processing component. This full velocity plane is used in conjunction with the frequency to identify the filter coefficients.

In an alternative embodiment, a cube of velocity data is created by interpolation from estimated subsurface velocity data, of spatial dimension equal to the space-depth cube of interest. A sub-sampled version is then stored in the Data Vault. During migration for a given depth, the two closest velocity planes are read from the Data Vault into local memory. The velocities at a given depth are then calculated by linear interpolation. The net accuracy is enhanced because the sub-sampling rate can be increased for subsurface areas where the velocity is changing rapidly.

III. Wavefield Extrapolation

Wavefield extrapolation is critical in the migration process. (The terms "wavefield extrapolation" and "downward continuation" are sometimes used interchangeably.) At each depth level an imaging step is performed, which is the extraction of zero time amplitudes from the downward continued data cube. Downward continuation in the space-frequency (x,y,f) domain is preferable because it can more accurately image steeply dipping geological layers. In the space-frequency domain, the 2D scalar (two way) wave equation can be written as:

$$\frac{\partial}{\partial z}\begin{bmatrix} U \\ D \end{bmatrix} = \begin{bmatrix} -ik_2 & 0 \\ 0 & ik_2 \end{bmatrix}\begin{bmatrix} U \\ D \end{bmatrix} + r(k_z + Z)\begin{bmatrix} 1 & -1 \\ -1 & 1 \end{bmatrix}\begin{bmatrix} U \\ D \end{bmatrix}$$

where $k_2 = (w^2/c^2 - k_x^2)^{\frac{1}{2}}$, $U = U(w,k_x,z)$, $D = (w,k_x,z)$ represent the upgoing and downgoing waves respectively, w is the frequency (measured in radians per unit time), c is propagation velocity, and $k_x$ is the wave number (measured in radians per sample) in the x direction. $r(k_z,z)$ is the reflectivity function. This equation holds for a horizontal layered media. The first term in the equation accounts for the one way propagation of a wave in a homogeneous media. The second term accounts for transmission losses and coupling between the upgoing and downgoing waves at the interfaces. If transmission losses are neglected, the 2D scalar wave equation can be rewritten as:

$$\partial P/\partial z = \pm ik_z P$$

where P may be upward U or downward D. This is the basis for one way wave propagation such as using the exploding reflector model.

The analytical solution to this equation is:

$$P(w,k_x,z+\Delta z) = e^{\pm ik_z \Delta z} P(w,k_x,z)$$

corresponding to downward extrapolation of one way waves. This analytical solution can be approximated in the space-frequency domain with known finite difference techniques. These finite difference techniques resemble a 2D convolution when known techniques have been applied, collectively known as splitting or layer splitting. However, using conventional layer splitting techniques, computer accuracy or computer efficiency Is sacrificed. The present method takes the finite difference approximation in the space-frequency domain and recasts the problem as a filter. The Fourier transform approximates:

$$D(k) = e^{i\frac{\Delta z}{\Delta x}[(\frac{w\Delta z}{v})^2 - k^2]^{\frac{1}{2}}}$$

where w denotes frequency, v is the velocity, and z and x are vertical and horizontal spatial sampling intervals, and k is the wave number. Wavefield extrapolation is therefore reduced to applying a 2D filter with the above characteristics to every frequency in the data cube.

Figure 2:
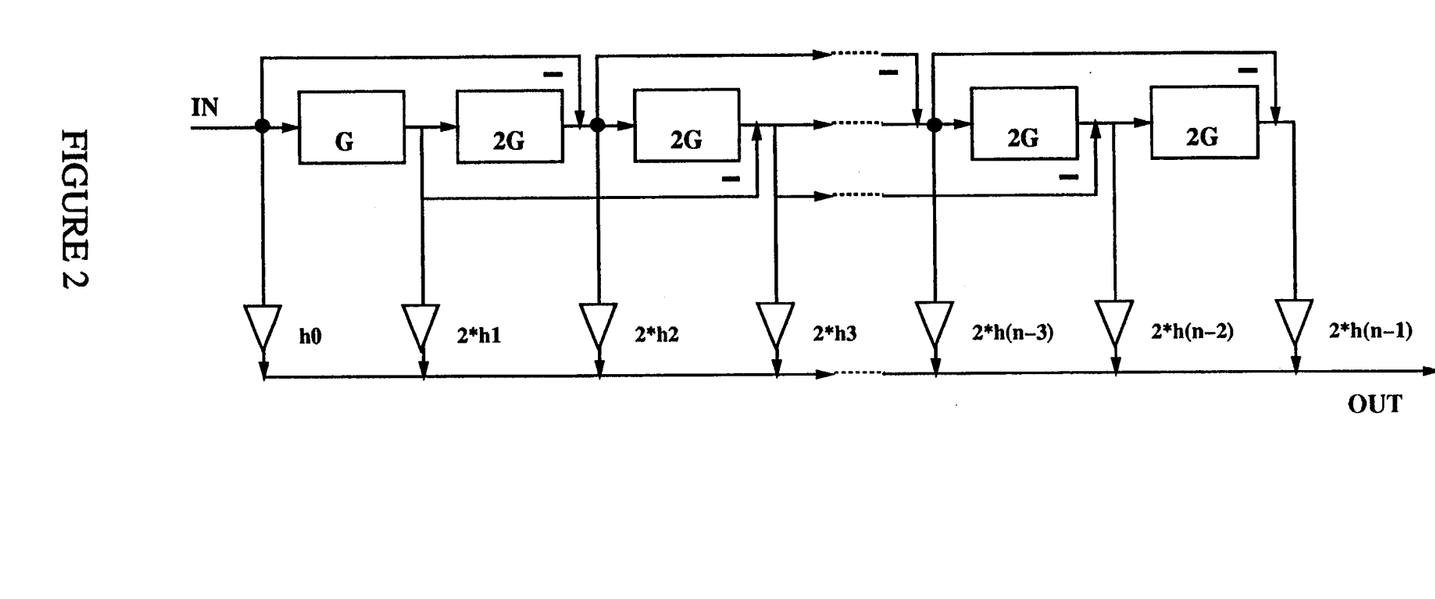
FIG. 2 is a diagram illustrating the Chebyshev recursive filter structure.

This filter analogy is quite useful but the filter must operate over a wide range of frequencies and be accurate to extrapolate the wavefield at significant dipping angles. Accuracy dictates a large number of coefficients for the filter and is computationally expensive. The present method uses a process to build the desired large filter using recursive Chebyshev filter structure for 2D convolution with radially symmetric operators. FIG. 2 illustrates this recursive Chebyshev structure.

Using this scheme, the large filter can be expressed as a sum of small, fixed size, convolution filters along with additions. Because these small symmetric convolutions are identical over an entire frequency plane, intermingled with scalar complex multiplications, significant computational savings can be realized.

Figure 3:
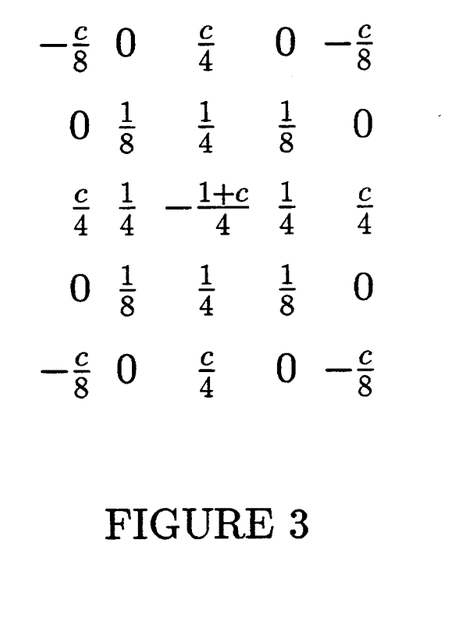
FIG. 3 is a table illustrating the real constant 2D $5 \times 5$ convolution operator G.

FIG. 3 illustrates the 5×5 G operator used in the filter of FIG. 2. In the G operator of FIG. 3 the c constant can vary as a function of frequency with little additional computational cost. In the preferred embodiment, G is fixed and used for all frequencies. While different sized operators G might be used, the 5×5 operator of FIG. 3 is believed well suited for most problems. A fixed value of c=0.0255 has proven useful.

IV. Depth Migration

A simple outline of the depth migration method is:
1. Initialization
2. For each frequency:
    A. Initialization for one frequency
    B. For each depth
        i. Compute velocity
        ii. Extrapolate
        iii. Update depth map Initialization comprises previously described procedures such as converting the seismic data to the space-frequency domain and storing the space-frequency data cube in the Data Vault. Additionally, a velocity cube is stored in the Data Vault.

Figure 4:
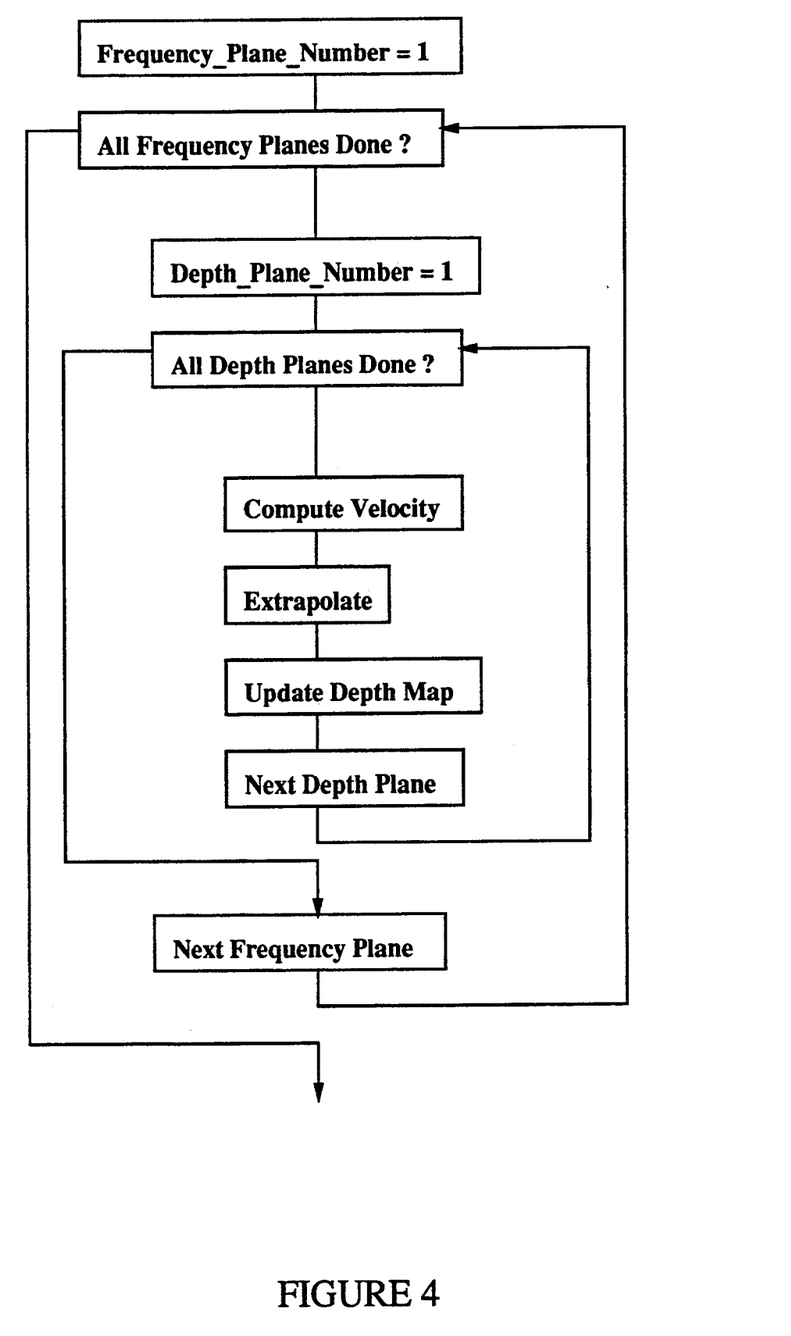
FIG. 4 is a flow chart depicting depth migration by frequency plane.

FIG. 4 illustrates schematically a flow chart for the downward continuation. As can be seen in FIG. 4, for a single frequency plane, the data is downwardly continued for all depth planes of interest As shown in FIG. 4, after computing a velocity map for the depth of interest, the filter coefficients are computed independently for each spatial position (x,y) in the x,y plane. To accomplish this, a processing component is assigned to the subgrids in the x,y plane. Each subgrid contains one or more x,y spatial positions with the subgrids migrated concurrently in parallel by the respective processing component.

A reduced set of filter coefficients (used as $h_n$ in the filter of FIG. 2) is stored as a table in local CM2 memory. This reduced table of filter coefficients is stored redundantly in the local memory of every processing component to increase efficiency. For a CM2 with 32 processing elements per group, one filter coefficient table is stored in the local memory of each group.

The filter coefficients are retrieved from the coefficient table by indexing with frequency and velocity; hence the velocity map for the depth plane of interest is critical. Each processing component can access the coefficient table with a different index value, to retrieve a distinct set of filter coefficients for each x,y position. Therefore, a distinct extrapolation operator is computed for each x,y point by the filter of FIG. 2 at a very low cost for each depth and frequency. The result is an extrapolated plane of depth shifted x,y spatial positions.

The depth map for each frequency (x,y,d) is held in the Data Vault. As can be seen in FIG. 4 after extrapolation for a particular depth, the result is used to update the depth maps. This is accomplished by entering the depth map held in the Data Vault and adding the real components of the current frequency to the map for the particular depth.

As shown in FIG. 4, a single frequency for all depths of interest is downward continued. After all depths for a single frequency have been downward continued, the next frequency plane is entered and the process repeated for all frequency planes of interest.

Figure 5:
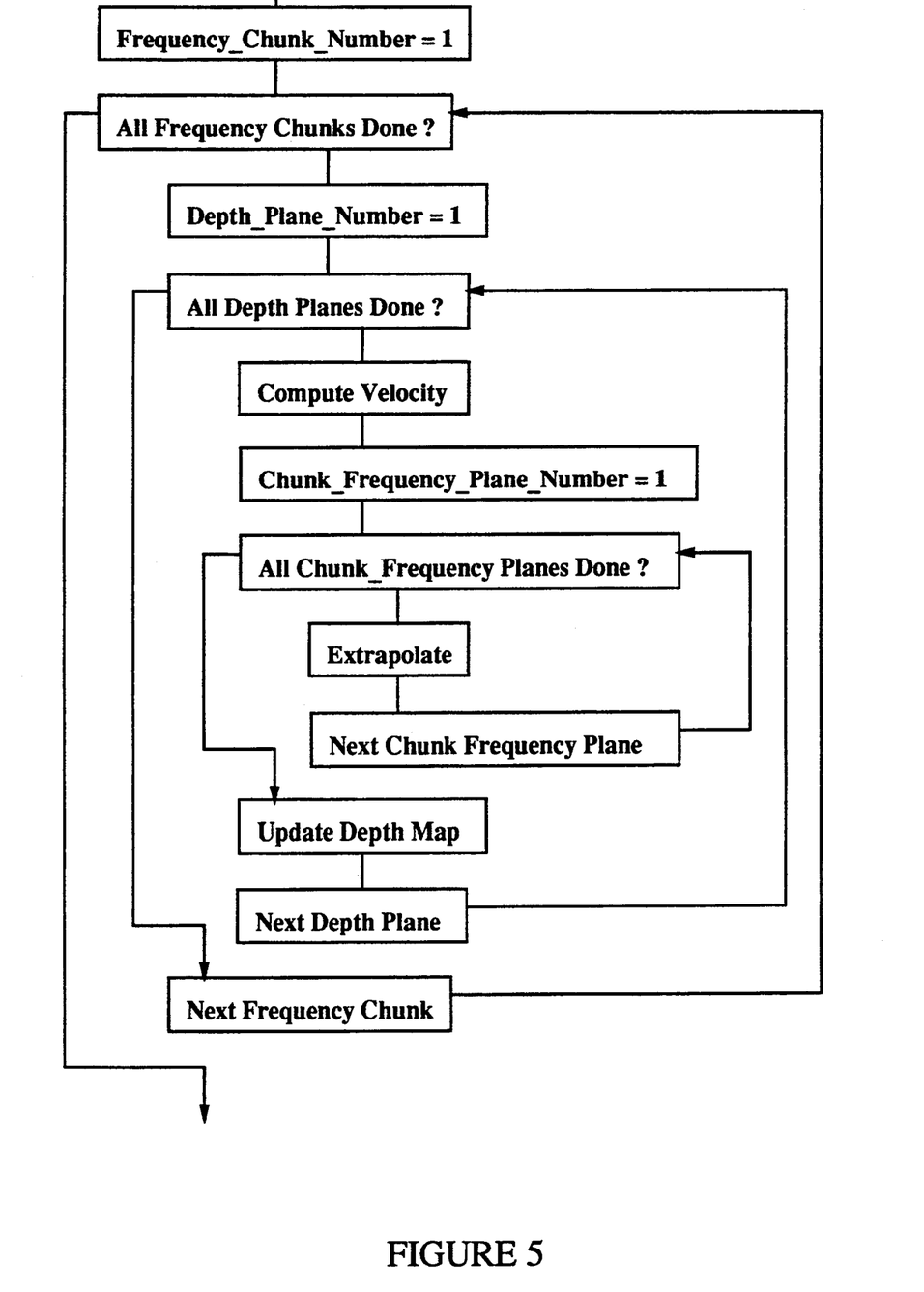
FIG. 5 is a flow chart, similar to FIG. 4, describing depth migration by frequency chunk.

FIG. 5 is quite similar to FIG. 4, but includes an optimization for input/output time and computation time. In FIG. 5, the frequency planes have been grouped into "chunks" that are extrapolated together through all depth levels. Computation time is reduced because the per frequency initialization cost (e.g. data input and velocity computation) and the depth map updating are amortized over all the frequency planes in the frequency chunk. The extrapolation step in FIG. 4 and FIG. 5 are identical.

V. Time Migration 3D one-pass depth migration is most useful for interpretation. In depth migration, the extrapolation step is constant and the method is capable of handling large lateral and vertical velocity variations. However, depth migration requires an accurate velocity model to obtain accurate results. In contrast, the time migration extrapolation step is a function of the local velocity. Time migration is inaccurate and yields poor results with large lateral velocity changes. However, time migration can use a poor velocity model to obtain reasonable results. Therefore, time migration is useful for refining a velocity model for a seismic survey.

Figure 7:
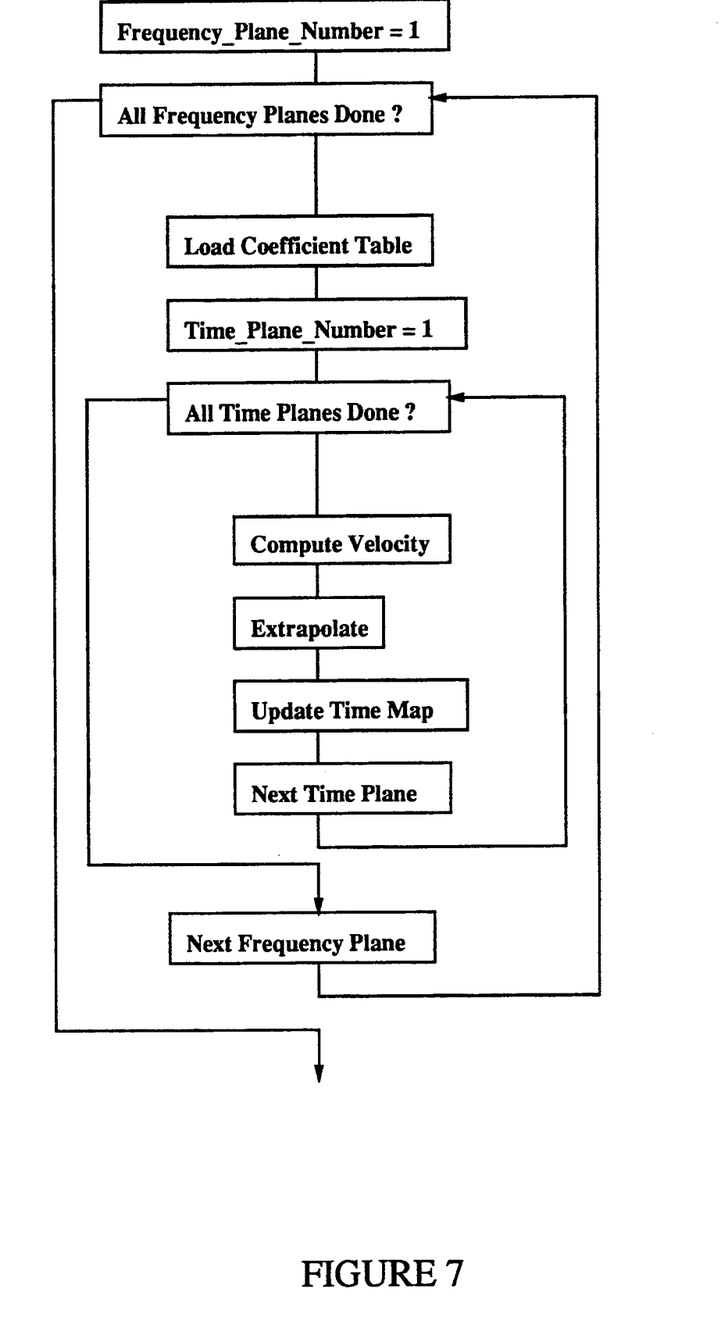
FIG. 7 is a flow chart depicting time migration by frequency plane.

FIG. 7 illustrates a flow chart for time migration and should be compared with FIG. 4. As can be seen from the comparison, depth and time migration are conceptually quite similar. The significant difference is that before each frequency plane is downward continued, a separate operator G is loaded so that separate $h_n$ operator coefficients can be calculated for each frequency. Of course, during time migration planes of constant time increments are determined in contrast to depth increments.

VI. Source Code Appendix

A five page source code Appendix A-D is attached. In Appendix A, the 5×5 G operator is applied.

Appendix B applies the Chebyshev filter illustrated in FIG. 2. As can be appreciated from Appendix B, the operator coefficients $h_n$ are computed by linear extrapolation from the filter coefficient table.

Appendix C shows the code for looking up the filter coefficients from the coefficient table.

Appendix D should be compared with FIG. 5 and describes in detail the downward continuation methodology for frequency "chunks".

APPENDIX A

```
c AUTHOR:  Peter Highnam (Schlumberger Laboratory for Computer Science)
c
c Apply Hale (1990)'s G5 operator. The Hale c parameter is supplied via
c the include file. This is no more than a 5x5 real convolution (with
c only 17 non-zero entries) that is applied to a 2D complex array, producing
c a 2D complex array. The code looks a little convoluted (sorry) because
c some effort has been made to exploit the symmetry of the G5 by making
c common subexpressions. Zeroes are imposed at the array boundaries.

subroutine g5( from_plane , to_plane )
      implicit none include 'parameters.inc' real, parameter :: MINUS_C_OVER_8 = - HALF_C * 0.125
      real, parameter :: C_OVER_4       =   HALF_C * 0.25
      real, parameter :: C_CENTER_COEFF = - ( 1.0 + HALF_C ) * 0.5 complex, array( X_SIZE, Y_SIZE ) :: from_plane , to_plane
cmf$ layout from_plane(,),to_plane(,)

complex, array( X_SIZE, Y_SIZE ) :: temp11 , temp13 , temp22 , temp23
cmf$ layout temp11(,),temp13(,),temp22(,),temp23(,)

complex, array( X_SIZE, Y_SIZE ) :: temp1 , temp2
cmf$ layout temp1(,),temp2(,)

temp11 =   MINUS_C_OVER_8 * from_plane
      temp13 =   C_OVER_4       * from_plane
      temp22 =   0.125          * from_plane
      temp23 =   0.25           * from_plane temp1 = coshift( temp11 , DIM=2 , SHIFT= -2 ) +
     &        temp13 +
     $        coshift( temp11 , DIM=2 , SHIFT=  2 )
```

```
      temp2 = eoshift( temp22 , DIM=2 , SHIFT= -1 ) +
     $        temp23 +
     $        eoshift( temp22 , DIM=2 , SHIFT=  1 )

to_plane = eoshift( temp1  , DIM=1 , SHIFT= -2 ) +
     $           eoshift( temp1  , DIM=1 , SHIFT=  2 ) +
     $           eoshift( temp2  , DIM=1 , SHIFT= -1 ) +
     $           eoshift( temp2  , DIM=1 , SHIFT=  1 ) +
     $           eoshift( temp13 , DIM=2 , SHIFT= -2 ) +
     $           eoshift( temp13 , DIM=2 , SHIFT=  2 ) +
     $           eoshift( temp23 , DIM=2 , SHIFT= -1 ) +
     $           eoshift( temp23 , DIM=2 , SHIFT=  1 ) +
     $           C_CENTER_COEFF * from_plane return
      end
```

APPENDIX B

```
C AUTHOR: Peter Highnam (Schlumberger Laboratory for Computer Science)
C
C Extrapolate a single frequency plane (plane_param), one depth step.
C The filter to be applied has been identified in terms of table entry index (coeff_low_index)
C and linear interpolation fraction (omega_velocity_fraction).
C The method is to apply the Chebyshev filter (Hale 1990) directly.

subroutine box_noir( plane_param , coeff_low_index , omega_velocity_fraction )
      implicit none include 'parameters.inc' complex , array ( X_SIZE , Y_SIZE ) :: plane_param
cmf$ layout plane_param(,)
         integer , array ( X_SIZE , Y_SIZE ) :: coeff_low_index
cmf$ layout coeff_low_index(,)
         real    , array ( X_SIZE , Y_SIZE ) :: omega_velocity_fraction
cmf$ layout omega_velocity_fraction(,)

C----------------------------------------------------------- complex plane      (    4, X_SIZE, Y_SIZE )
cmf$ layout  plane      (:serial, :news, :news )

integer, parameter :: PLANE_INDEX_INITIAL   = 1
      integer, parameter :: PLANE_INDEX_STARTER_M2 = 1
      integer, parameter :: PLANE_INDEX_STARTER_M1 = 2
      integer, parameter :: PLANE_INDEX_STARTER    = 3
      integer, parameter :: PLANE_INDEX_NEW        = 4
C---- Assert -- STARTING_PLANE == STARTER_M2 integer integer_temporary_scalar
      integer plane_index_scalar
      integer plane_index_m1_scalar
      integer plane_index_m2_scalar complex h_i       ( X_SIZE , Y_SIZE )
cmf$ layout h_i(:news,:news)

integer hale_index_scalar plane ( PLANE_INDEX_INITIAL , : , : ) = plane_param plane_index_m2_scalar  = PLANE_INDEX_STARTER_M2
      plane_index_scalar     = PLANE_INDEX_STARTER
      plane_index_m1_scalar  = PLANE_INDEX_STARTER_M1 call compute_hale_coeff( 0 , coeff_low_index , omega_velocity_fraction , h_i )
      plane( PLANE_INDEX_NEW,:,: ) = h_i * plane( plane_index_m2_scalar,:,: )

call compute_hale_coeff( 1 , coeff_low_index , omega_velocity_fraction , h_i )
      call q5( plane( plane_index_m2_scalar,:,: ) , plane( plane_index_m1_scalar,:,: ) )
      plane( PLANE_INDEX_NEW,:,: ) = plane( PLANE_INDEX_NEW,:,: ) +
     $              2.0 * h_i * plane( plane_index_m1_scalar,:,: )

do hale_index_scalar = 2 , HALE_SIZE - 2 call compute_hale_coeff( hale_index_scalar , coeff_low_index ,
     $                            omega_velocity_fraction , h_i )
```

```
      call q5( plane( plane_index_m1_scalar,:,: ) , plane( plane_index_scalar ,:,:) )

plane( plane_index_scalar,:,: ) =
   $    2.0 * plane( plane_index_scalar,:,: ) - plane( plane_index_m2_scalar,:,: )

plane( PLANE_INDEX_NEW,:,: ) = plane( PLANE_INDEX_NEW,:,: ) +
   $    2.0 * h_i * plane( plane_index_scalar,:,: )

integer_temporary_scalar  = plane_index_scalar
      plane_index_scalar        = plane_index_m2_scalar
      plane_index_m2_scalar     = plane_index_m1_scalar
      plane_index_m1_scalar     = integer_temporary_scalar end do call compute_hale_coeff( HALE_SIZE - 1 , coeff_low_index ,
   $                         omega_velocity_fraction , h_i )

call q5( plane( plane_index_m1_scalar,:,: ) , plane( plane_index_scalar,:,: ) )

plane( plane_index_scalar,:,: ) =
   $    2.0 * plane( plane_index_scalar,:,: ) - plane( plane_index_m2_scalar,:,: )

plane( PLANE_INDEX_INITIAL,:,: ) = plane( PLANE_INDEX_NEW,:,: ) +
   $    2.0 * h_i * plane( plane_index_scalar,:,: )

plane_param = plane( PLANE_INDEX_INITIAL , : , : )

return
    end
```

APPENDIX C

```
C Author: Peter Highnam (Schlumberger Laboratory for Computer Science)
C
C Application level code for using the shared Hale coefficient tables.
C Look up the two adjacent complex entries for the coefficient (number
C in the shared table. Linearly interpolate using (fraction) to get h_i .
C The shared table is stored (linearized) as:
C   coeff #0 :        entry #0
C                     entry #1
C                     :
C                     entry #(max-1)
C   coeff #1 :        entry #0
C                     entry #1
C                     :
C                     entry #(max-1)
C   :
C   :
C   coeff #(N-1):     entry #0
C                     entry #1
C                     :
C                     entry #(max-1)
C
C -> access method:
C
C     Compute index from  coeff_number : 0 .. HALE_SIZE - 1
C                         lookup_index : 0 .. HALE_TABLE_SIZE - 1
C
C                         index = coeff_number * HALE_TABLE_SIZE + lookup_index
C
C     Assumption: (index + 1) is within the same coefficient range as (index).
C
C (1) The incoming lookup_index is the lower of the two table indices that correspond to
C     the two table entries that most closely bound the value of interest. Thus,
C     lookup high_value and low_value from one index.
C (2) Linear interpolate between high_value and low_value using (fraction) which represents
C     the proportion of (high_value - low_value) to add to low_value to get the result, h_i.

subroutine compute_hale_coeff( number_scalar , low_index , fraction , h_i )

implicit none
      include 'parameters.inc'
      include 'table.inc' integer  number_scalar
      integer  low_index ( X_SIZE , Y_SIZE )
cmf$  layout   low_index( , )
      real     fraction ( X_SIZE , Y_SIZE )
cmf$  layout   fraction( , )
```

```
      complex  h_i ( X_SIZE , Y_SIZE )
cmf$  layout   h_i ( , )

integer , array ( X_SIZE , Y_SIZE ) :: index
cmf$  layout index(,)
      complex , array ( X_SIZE , Y_SIZE ) :: low_value , high_value
cmf$  layout low_value(,) , high_value(,)

index = number_scalar * HALF_TABLE_SIZE + low_index + 1

C---- Read the single precision complex number for the low value.
      call CMF_lookup_in_table( low_value , table_id , index , .true. )

index = index + 1

C---- Read the single precision complex number for the high value.
      call CMF_lookup_in_table( high_value , table_id , index , .true. )

C---- Linear interpolation to get result.
      h_i = low_value + fraction * ( high_value - low_value )

return
      end
```

APPENDIX D

```
C AUTHOR: Peter Highnam (Schlumberger Laboratory for Computer Science)
C
C Extrapolate a given number of frequency chunks (nchunks), each composed of a given number
C of frequency planes (freq_chunk_size), a given number of depth steps (z_steps). The minimum
C frequency and the frequency separation of frequency planes are also supplied (freq_min_Hz,
C freq_step_Hz). This routine also reads a velocity and frequency file and reads and writes a
C map file. The files are assumed to have already been opened.

subroutine Downward_Continue ( z_steps ,
     $                               freq_chunk_size , nchunks ,
     $                               freq_min_Hz , freq_step_Hz )

implicit none include 'parameters.inc'
      include 'io.inc'
      include '/home/cm/include/cm/paris-configuration-fort.h'
      include '/home/cm/include/cm/CMF_defs.h' integer z_steps
      integer freq_chunk_size , nchunks
      real    freq_min_Hz , freq_step_Hz integer I
      integer status complex planes      ( freq_chunk_size , X_SIZE, Y_SIZE )
cmf$  layout  planes      ( :serial, :news, :news )

real , array ( X_SIZE , Y_SIZE ) :: velocity , recip_velocity
cmf$  layout  velocity(:news,:news) , recip_velocity(:news,:news)

C---- Basic ratio.
      real    omega_velocity ( X_SIZE , Y_SIZE )
cmf$  layout omega_velocity(:news,:news)

C---- Ratio as a fraction of the coefficient table spacing.
      real    omega_velocity_fraction ( X_SIZE , Y_SIZE )
cmf$  layout omega_velocity_fraction(:news,:news)

C---- The low coefficient table index.
      integer coeff_low_index ( X_SIZE , Y_SIZE )
cmf$  layout coeff_low_index(:news,:news)

C---- Post-extrapolation edge mask.
      real taper ( X_SIZE , Y_SIZE )
cmf$  layout taper( :news , :news )

C---- Map plane being updated.
      real , array ( X_SIZE , Y_SIZE ) :: map_slice
cmf$  layout map_slice( :news , :news )

C---- Which frequency chunk, and the plane number in that chunk.
      integer freq_chunk_number , freq_number
```

```
C----  Frequency of current plane being extrapolated.
       real    frequency_scalar C----  Holds delta_z * 2 * PI * frequency.
       real    omega_delta_z_scalar C----  Depth plane number.
       integer z_number external is_a_power_of_two
       logical  is_a_power_of_two C---- >>
C---- >> Error checking on parameters has been excised.
C---- >>

C----  For each frequency chunk.
       DO  freq_chunk_number = 0 , nchunks-1

C-------  Read frequency chunk.
          call CM_cm_array_from_file( FREQUENCY_UNIT , planes , status )
          if ( status .eq. -1 ) stop 'FATAL> Could not read frequency chunk.'

C-------  Move Map File Pointer Back to Start.
          call CM_file_rewind( MAP_UNIT , status )
          if ( status .eq. -1 ) stop 'FATAL> Could not reposition map file pointer.'

C-------  Move Velocity File Pointer Back to Start'
          call CM_file_rewind( VELOCITY_UNIT , status )
          if ( status .eq. -1 ) stop 'FATAL> Could not reposition velocity file pointer.'

C-------  For each depth level.
          DO  z_number = 1 , z_steps

C---------  Read velocity plane.
             call CM_cm_array_from_file( VELOCITY_UNIT , velocity , status )
             if ( status .eq. -1 ) stop 'FATAL> Could not read read velocity plane.'

C---------  For z=1 we don't extrapolate...
             IF ( z_number .gt. 1 ) THEN recip_velocity = 1.0 / velocity C-----------  For each frequency plane in the chunk.
                DO  freq_number = 0 , freq_chunk_size - 1
                   frequency_scalar = freq_min_Hz +
     $                ( freq_chunk_number * freq_chunk_size + freq_number ) * freq_step_Hz omega_delta_z_scalar    = DELTA_Z_2_PI * frequency_scalar
                   omega_velocity          = ( omega_delta_z_scalar * recip_velocity ) - HALF_TABLE_MIN_OMEGA_V
                   coeff_low_index         = INT( omega_velocity * RECIP_HALF_TABLE_OMEGA_V_STEP )
                   omega_velocity_fraction = omega_velocity * RECIP_HALF_TABLE_OMEGA_V_STEP - real( coeff_low_index )

C-----------  Extrapolate this frequency plane.
                   call box_noir ( planes( freq_number+1 , : , : ) ,
     $                             coeff_low_index ,
     $                             omega_velocity_fraction )

C-----------  Taper the edges.
                   planes( freq_number+1,:,: ) = cmplx( taper * real( planes( freq_number+1 ,:,: ) ) ,
     $                                                   taper * aimag( planes( freq_number+1 ,:,: ) ) )
                END DO END IF
C-------  End of extrapolation step.

C-------  Update the depth map. First time through we just write out, after that we have to update the old map.
          if ( freq_chunk_number .eq. 0 ) then
             map_slice = real( planes( 1,:,: ) )
             DO  I = 2 , freq_chunk_size
                map_slice = map_slice + real( planes( I,:,: ) )
             END DO
          else
             call CM_cm_array_from_file( MAP_UNIT , map_slice , status )
             if ( status .eq. -1 ) stop 'FATAL> Cannot read map plane' call CM_file_lseek( MAP_UNIT , - CM_sizeof_array_element( map_slice ) , status )
             if ( status .eq. -1 ) stop 'FATAL> Cannot lseek map plane back one'

DO  I = 1 , freq_chunk_size
                map_slice = map_slice + real( planes( I,:,: ) )
             END DO
          end if
```

```
          call OUT_cm_array_to_file( MAP_UNIT , map_slice , status )
          if ( status .eq. -1 ) stop 'FATAL> Cannot write map plane'
        END DO
C------- End of depth loop.

END DO
C---- End of frequency chunk loop.

return
      end
```

We claim:

1. A method for time migration of space-time domain seismic data to build a reflector time map using a parallel computer having a number of processing components, comprising the steps of:
   (1) transforming the seismic data from the space-time domain x,y,t to a space frequency domain x,y,f data cube using a Fourier transform process;
   (2) storing the space frequency data cube in computer memory;
   (3) grouping one or more frequency planes from said space frequency data cube into frequency chunks;
   (4) downwardly continuing the space frequency data cube for each frequency chunk through a number of time steps to obtain a reflector time map, where for each time step the method includes the substeps of
   (a) modeling a velocity profile,
   (b) loading a table of operator coefficients into memory,
   (c) for a single frequency plane within the frequency chunk, assigning processing components to respective subgrids of one or more x,y spatial positions in the x,y plane,
   (d) extrapolating all of the x,y spatial positions by concurrently operating several processing components in parallel, for each x,y position the extrapolation using the velocity profile and some of the operator coefficients from the table,
   (e) building the reflector time map.

2. The method of claim 1, wherein the migration is performed using post stack seismic data.

3. The method of claim 1, wherein the downward continuation step includes the substep of controlling the processing components using a single instruction multiple data method.

4. The method of claim 1, the modeling a velocity profile substep (4)(a) comprising reading the velocity plane for the depth of interest into local memory of each processing component.

5. The method of claim 1, wherein the extrapolating substep includes applying a 2D filter.

6. The method of claim 5, wherein the 2D filter having a number of filter coefficients is expressed as a sum of fixed size convolution filters using Chebyshev recursion.

7. The method of claim 5, wherein the 2D filter is in part described by a number of filter coefficients retrieved from a table of filter coefficients, the table being stored in local memory of each processing component.

8. The method of claim 7, wherein an entry in a filter coefficient table is retrieved by indexing the table with a velocity value and a frequency value.

9. The method of claim 8, wherein each processing component includes a plurality of processors, and each processor can access the stored table with different index values.

10. The method of claim 5, wherein the filter coefficients are determined independently for each x,y spatial position.

11. The method of claim 5, wherein the 2D filter is in part described by a symmetrical operator G.

12. The method of claim 11, wherein the operator G is a 5×5 mask with some of the mask entries variant as a function of frequency and velocity.

13. The method of claim 11, wherein the operator G is a 5×5 mask with constant mask entries for all frequencies.

14. A method for migrating seismic data using a computer system having a number of processing components operable in parallel, where the seismic data cube is in the space frequency domain x,y,f and is stored in computer memory, characterized by:
   grouping one or more frequency planes from the seismic data cube into frequency chunks; and
   downwardly continuing for each frequency chunk through a number of time steps to obtain a seismic reflector time map where for each step the method includes the substeps of
   (a) for a single frequency plane within the frequency chunk, assigning processing components to respective subgrids of one or more x,y spatial positions,
   (b) determining a velocity profile for respective subgrids, and
   (c) extrapolating data at all x,y spatial positions in the subgrids by concurrently operating several processing components in parallel, using said velocity profile and frequency associated with said frequency plane to determine the filter coefficients of a 2D filter applied to said single frequency plane.

15. The method of claim 14, wherein the 2D filter is in part described by a number of filter coefficients retrieved from a table of filter coefficients, the table being stored in local memory of each processing component.

16. The method of claim 14, wherein the filter coefficients are determined independently for each x,y spatial position.

17. The method of claim 14, wherein the downward continuation step includes the substep of updating said seismic reflector time map with said extrapolated data at all x,y spatial positions.

18. The method of claim 14, wherein the downward continuation step is performed concurrently for a plurality of single frequency planes within said frequency chunk.

19. A method of migrating a space-time seismic data cube to a space-time reflector map comprising the steps of:
   transforming the space-time data cube into a space-frequency data cube comprising a plurality of frequency planes;

extrapolating some of the frequency planes of the space-frequency data cube through the time levels of interest by assigning for a frequency plane processing components of a computer system to subgrids of one or more x,y spatial positions in the frequency plane, applying a frequency and velocity dependent 2D filter by concurrently operating the processing components in parallel to obtain a wavefield extrapolation; and creating a space-time reflector map using the wavefield extrapolations for said some frequency planes.

* * * * *